United States Patent
Wu

(10) Patent No.: US 7,334,149 B1
(45) Date of Patent: Feb. 19, 2008

(54) CLOCK DISTRIBUTION ARCHITECTURE WITH SPREAD SPECTRUM

(75) Inventor: Chung-Hsiao R. Wu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 680 days.

(21) Appl. No.: 10/809,156

(22) Filed: Mar. 25, 2004

(51) Int. Cl.
*G06F 1/04* (2006.01)
*G04B 1/00* (2006.01)

(52) U.S. Cl. .................................. 713/500; 375/130
(58) Field of Classification Search ............... 713/500; 375/130
See application file for complete search history.

(56) References Cited

U.S. PATENT DOCUMENTS

| | | | |
|---|---|---|---|
| 5,909,472 A | 6/1999 | Arnett | |
| 6,658,043 B2 * | 12/2003 | Hardin et al. | 375/130 |
| 6,687,319 B1 | 2/2004 | Perino et al. | |
| 6,771,134 B2 | 8/2004 | Wong et al. | |
| 6,850,554 B1 * | 2/2005 | Sha et al. | 375/140 |
| 7,061,331 B2 * | 6/2006 | Parikh | 331/16 |

* cited by examiner

*Primary Examiner*—Rehana Perveen
*Assistant Examiner*—Eric Chang
(74) *Attorney, Agent, or Firm*—Meyertons Hood Kivlin Kowert & Goetzel, P.C.; Erik A. Heter

(57) ABSTRACT

A redundant clock distribution system with spread spectrum. In one embodiment, a clock board includes a clock synthesizer configured to provide an input clock signal, and a spread spectrum unit coupled to receive the input clock signal. The spread spectrum unit is configured to frequency modulate the input clock signal, thereby producing an output clock signal wherein energy of the output clock signal is spread over a range of frequencies.

20 Claims, 4 Drawing Sheets

CLOCK DISTRIBUTION ARCHITECTURE WITH SPREAD SPECTRUM

BACKGROUND OF THE INVENTION

1. Field of the Invention

This invention relates to computer systems, and more particularly, to the reduction of electromagnetic energy in redundant clock distribution systems.

2. Description of the Related Art

High availability computer systems such as file servers typically require reliable power and clocking. Power and/or clock failures may result in system down time. In some systems, even a momentary interruption in power or clocking may result in a system crash. In order to prevent system down time, redundancy may be built into the power and/or clocking circuitry.

Redundancy for clocking of a computer system may be provided using multiple clock boards. Each of the clock boards may include detection circuitry for detecting the presence of a clock signal which is provided to the computer system. One clock board may act as a primary clock board, with one or more clock boards acting as secondary clock boards. If the primary clock board fails, one of the secondary clock boards may detect this failure and take over as the primary clock board.

The clock boards used in such a redundant clock system may produce a significant amount of electromagnetic energy, which may in turn lead to electromagnetic interference (EMI). The presence of EMI may have adverse affects on the operation of other computer system components. Thus, it is necessary to take measures to reduce the potential for EMI resulting from the operation of redundant clocking systems.

SUMMARY OF THE INVENTION

A redundant clock distribution system with spread spectrum units is disclosed. In one embodiment, a clock board includes a clock synthesizer configured to provide an input clock signal, and a spread spectrum unit coupled to receive the input clock signal. The spread spectrum unit is configured to frequency modulate the input clock signal, thereby producing an output clock signal wherein energy of the output clock signal is spread over a range of frequencies.

In one embodiment, a computer system includes a first clock board and a second clock board, each including a clock synthesizer and a spread spectrum unit. Each of the clock boards is coupled to provide a clock signal to a plurality of clocked circuits in the computer system. The first clock board is configured to operate as a master clock board and the second clock board is configured to operate as a slave clock board. The second clock board may begin operating as the master clock board responsive to a failure of the first clock board. When the first clock board is operating as a master, its respective spread spectrum unit is enabled, while the spread spectrum unit of the second clock board, when operating as a slave, is disabled. The spread spectrum unit of the second clock board may be enabled responsive to the second clock board beginning operation as the master. Conversely, the spread spectrum unit of the first clock board may be disabled responsive to a failure of the first clock board or a situation where the first clock board begins operation as a slave.

BRIEF DESCRIPTION OF THE DRAWINGS

Other aspects of the invention will become apparent upon reading the following detailed description and upon reference to the accompanying drawings in which.

Figure 1:
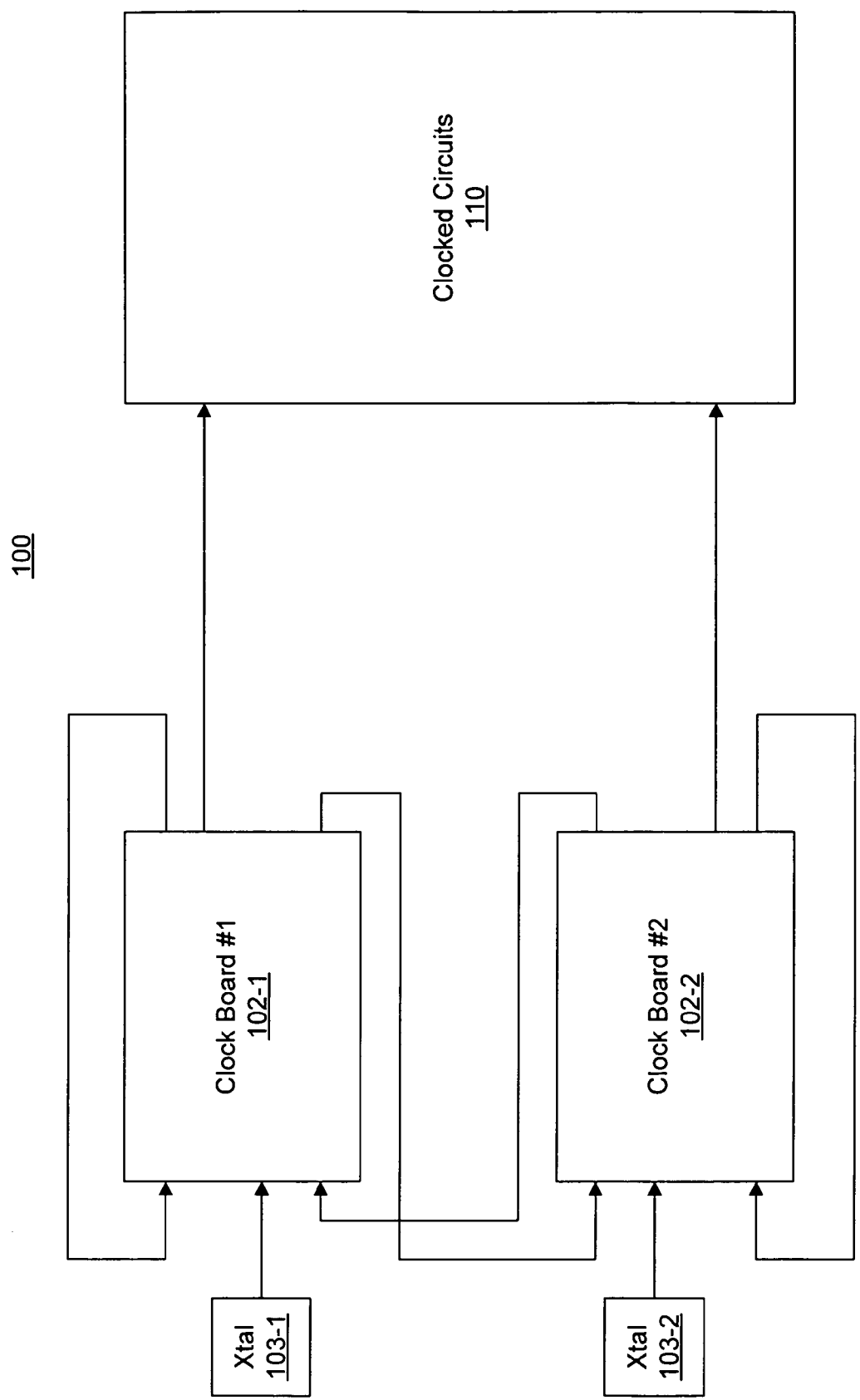
FIG. 1 is a block diagram of one embodiment of a computer system having a redundant clock distribution architecture.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1, a block diagram of one embodiment of a computer system having a redundant clock distribution architecture is shown. In the embodiment shown, computer system 100 includes clocked circuits 110. Clocked circuits 110 may include a plurality of various types of electronic circuits, such as processors, memory devices, peripheral controllers, bus bridges, and so on. In general, virtually any type of circuitry that receives a clock signal may be included in clocked circuits 110.

The clocked circuits 110 may receive a clock signal from one of clock boards 102. and provides a clock signal during operation of the computer system. Each of the clock boards is coupled to receive a clock signal from a crystal 103. Both of the clock boards are coupled to provide a clock signal to the clocked circuits 110. In addition, each of the clock boards 102 is coupled to receive a clock signal from the other one of the clock boards. Each of the clock boards 102 is also configured to receive a feedback clock signal from its own output.

In the embodiment shown, one of the clock boards 102 serves as a master clock board. The other one of the clock boards 102 acts as a slave (or backup) clock board, and monitors the clock signal provided by the master. For example, clock board 102-1 may act as a master while clock board 102-2 may act as a slave in the embodiment shown. However, either of the clock boards 102 may act as a master or a slave. If the slave clock board detects a failure of the master clock board, the slave clock board will then assume the role as the master. It should be noted the both the master and the slave clock boards may provide a clock signal to clocked circuits 110 when operating in a redundant clocking mode.

Each of the clock boards 102 may detect a failure of the other clock board in various ways. For example, if clock board 102-2 is acting as a slave, it may detect a failure of clock board 102-2 (acting as the master) by detecting a number (e.g., three) of consecutive missing clock edges.

By providing clocking redundancy for a computer system in the manner provided by the various embodiments of FIG. 1, a computer system may continue operating even after a clock failure. After the slave clock board assumes duties of the master, upon failure of the original master, the original master clock board may be replaced. The clock boards may be configured for hot swapping, and thus the failing clock board may be able to be replaced without interruption to system operation. Similarly, the ability of a slave clock board to assume the role of a master when the original master clock board fails may also prevent interruption to the operation of the system.

Computer system 100 may be virtually any type of computer system that includes a redundant clocking architecture. Server systems and other high-availability computer system commonly fall into this category, although the disclosure here is not limited to these types, and may include any system that requires a clock signal for clocked circuits.

Figure 2:
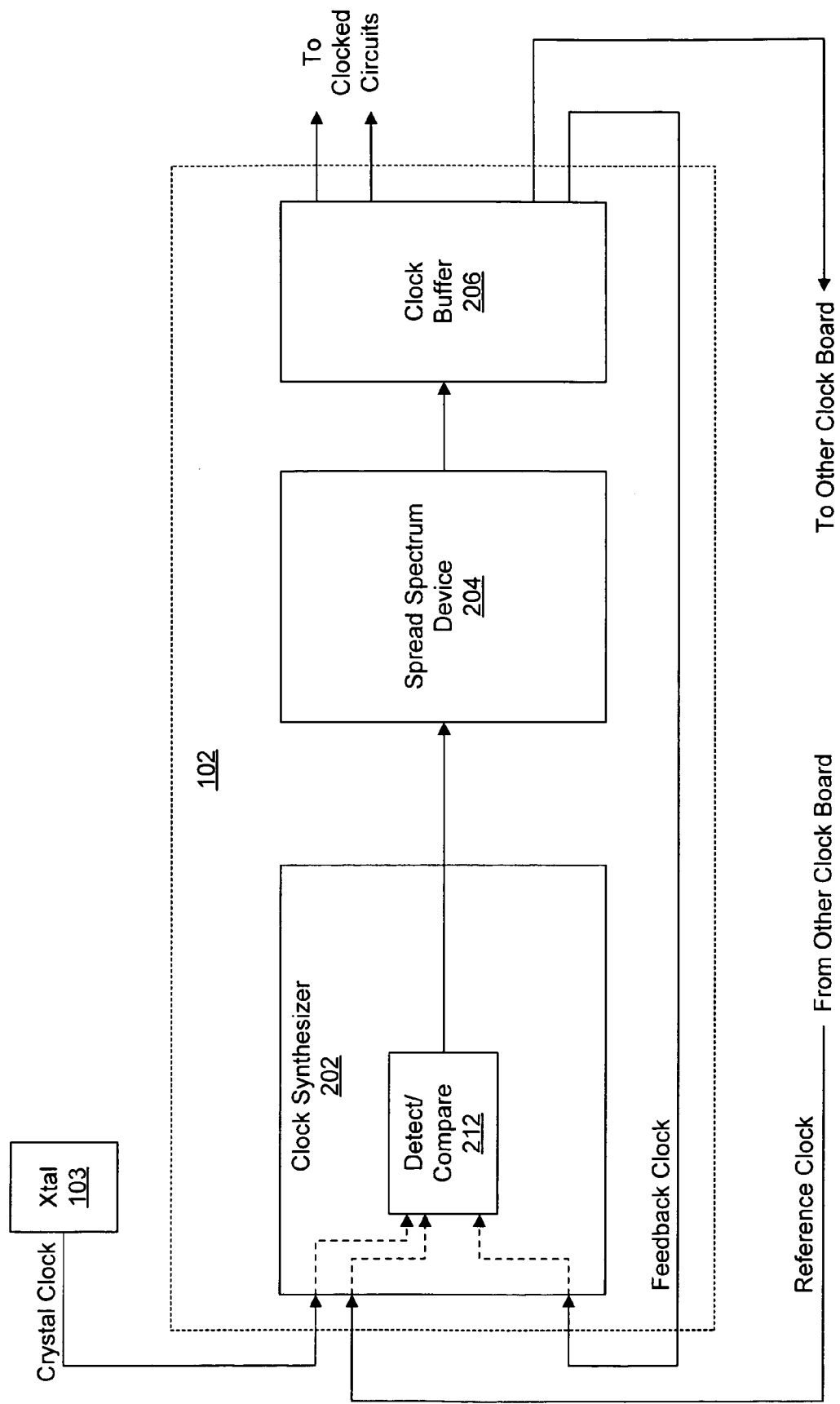
FIG. 2 is a block diagram illustrating one embodiment of a clock board for use in a redundant clock distribution architecture.

Moving now to FIG. 2, a block diagram illustrating one embodiment of a clock board for use in a redundant clock distribution architecture is shown. In the embodiment shown, clock board 102 includes a clock synthesizer 202, which is coupled to provide a clock signal to spread spectrum device 204. Spread spectrum device 204 is in turn coupled to provide a clock signal to clock buffer 206. Clock buffer 206 is coupled to provide a feedback clock signal to clock synthesizer 202.

Clock synthesizer 202 is coupled to receive a crystal clock signal from crystal 103. The crystal clock signal may be shaped into a waveform suitable for a system clock by clock synthesizer 202. Clock synthesizer 202 may also include a detect/compare circuit 212. When clock board 102 is operating as a master, detect/compare circuit 212 may compare a phase relationship between the crystal clock signal and the feedback clock signal, and if the phase difference exceeds a predetermined limit (e.g. 10%), clock synthesizer 202 will prevent the clock signal from being provided to spread spectrum device 204. When clock board 102 is implemented in a computer system as part of a redundant clock distribution architecture, this may result in another clock board taking over as the master. Clock board 102 may continue acting as a master clock board if the phase difference remains within the predetermined limit.

When clock board 202 is operating as a slave, detect/compare circuit 212 may compare the phase relationship between the reference clock signal (received from the master) and the feedback clock signal. Detect/compare circuit 212 monitors for a failure of the clock signal provided by the master clock board. If detect/compare circuit 212 detects a failure of the reference clock signal (e.g. a plurality of consecutive missing clock edges), clock board 102 may then assume the role as the master clock board. Detect/compare circuit 212 may respond to clock board 102 assuming the role of the master by beginning to compare the phase relationship between the crystal clock signal and the feedback clock signal.

In addition to detect/compare circuit 212, clock synthesizer 202 may also include various other circuitry, such as frequency multipliers or dividers, phase locked loops, and so on.

Spread spectrum device 204 is coupled to receive the input clock signal provided by clock synthesizer 202. Energy in the clock signal received by spread spectrum device is typically concentrated around the frequency of the clock signal. Spread spectrum device 204 may disperse some of the energy of the clock signal over a wider range of frequencies. By dispersing this energy, spread spectrum device may reduce the amount of electromagnetic energy (and thus the potential for electromagnetic interference, or EMI) than would otherwise be present in computer system 100. Specific details of spread spectrum device will be discussed in further detail below in reference to FIGS. 3 and 4.

The output clock signal provided spread spectrum device 204 is received by buffer 206. Buffer 206 may provide the necessary fan-out capability to drive the clock to the clocked circuits 110 of computer system 100. In addition, buffer 206 may also provide a feedback clock signal to clock synthesizer 202, and a reference clock signal to another clock board 102.

Figure 3:
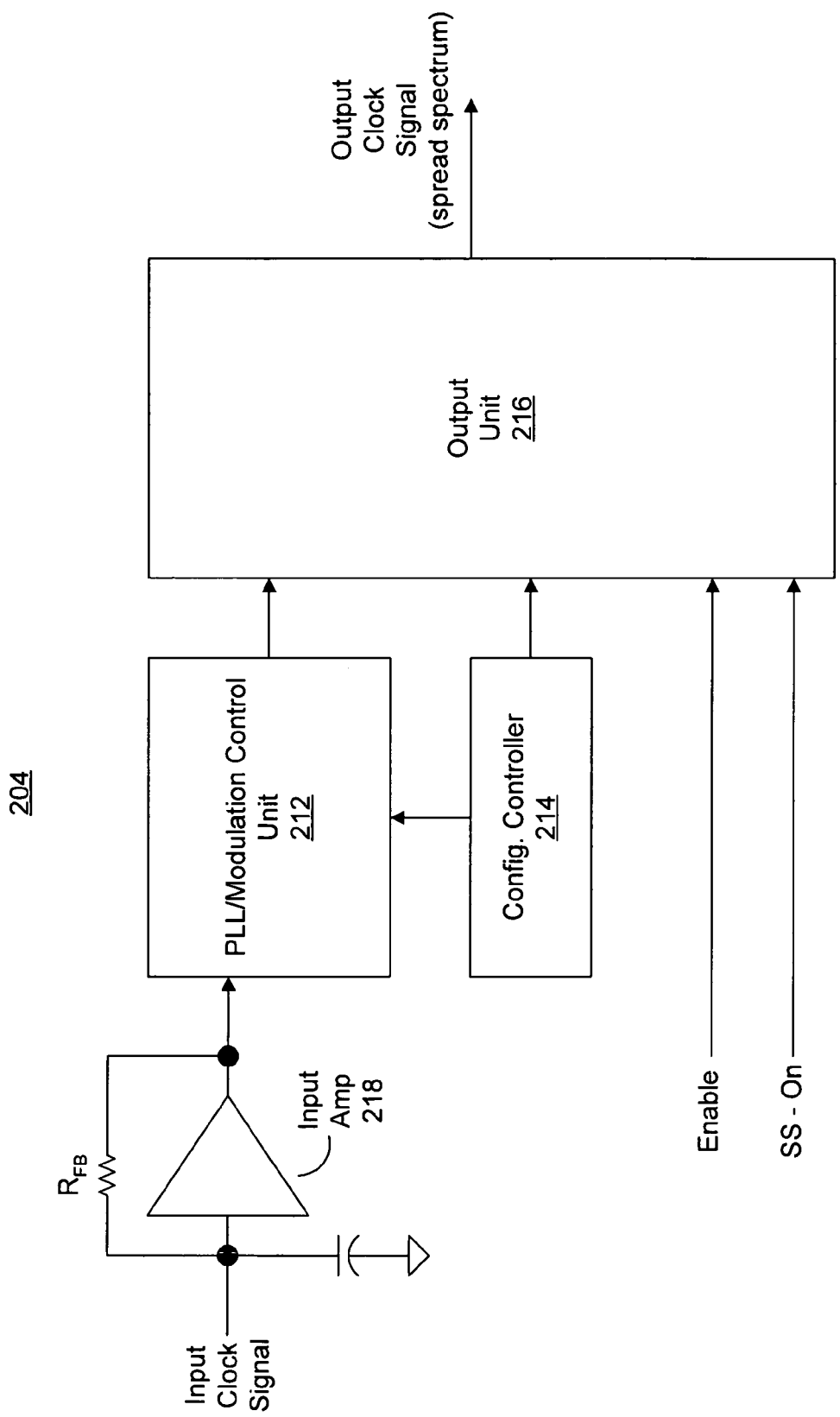
FIG. 3 is a block diagram of one embodiment a spread spectrum unit.

Turning now to FIG. 3, a block diagram of one embodiment a spread spectrum unit is shown. In the embodiment shown, spread spectrum unit 204 is configured to receive an input clock signal via input amplifier 218. Amplifier 218 increases the signal magnitude of the input clock signal. After amplification, the input clock signal is received by PLL/modulation control unit 212. A configuration controller 214 is coupled to PLL/modulation control unit 212 and thus provides control signals. Configuration controller 214 also provides control signals to output unit 216.

PLL/modulation control unit 212 may modulate the frequency of the input clock signal. This modulation may disperse some of the energy of the input clock signal across a wider portion of the frequency spectrum. As a result of this modulation, electromagnetic energy (and thus EMI) from the fundamental clock frequency and the harmonics thereof may be reduced. The modulated clock signal may then be provided to output unit 216.

Output unit 216 may include circuits for clock division or clock multiplication. An output clock signal may be provided by output unit 216. Output unit 216 is also coupled to receive an enable signal and a spread-spectrum on (SS-On) signal. The enable signal, when asserted, allows spread spectrum unit 204 to provide an output clock signal. The SS-On signal, when asserted, allows spread spectrum unit to provide an output clock signal where some of the energy has been dispersed over a range of frequencies.

In one embodiment when a clock board is acting as a master, its associated spread spectrum unit 204 is enabled (SS-On asserted). Conversely, when a clock board in such an embodiment is acting as a slave, its associated spread spectrum unit is disabled (SS-On de-asserted). Disabling the spread spectrum unit 204 of the slave clock board allows the clock board to track the master clock for which the spectrum has already been spread. The clock synthesizer on the slave clock board may operate with a wider PLL loop-bandwidth for tracking the spread spectrum master clock signal. Since the clock signal received by the synthesizer of the slave clock board is allowed to propagate through both the synthesizer and the spread spectrum unit, the output clock signal of the slave clock board will also be a spread spectrum signal.

In one embodiment, the dispersion of the energy from the input clock signal may be centered around its fundamental frequency (known as 'center spread'). In such a case, a roughly equal amount of the energy dispersed will be at frequencies above and below the fundamental clock frequency. Alternatively, the energy may be dispersed to one side of the fundamental frequency. For example, in an embodiment known as 'down spread', energy is dispersed to frequencies below the fundamental clock frequency. An 'up spread' mode is also contemplated. The mode in which the energy is dispersed may be determined by control signals provided by configuration controller 214 to PLL/modulation control unit 212.

Configuration controller 214 may also provide control signals to PLL/modulation control unit to determine the range of frequencies over which energy is to be dispersed. In one embodiment, the range of frequencies is a percentage of the fundamental clock frequency. For example, in one center spread embodiment, the frequency range may be plus or minus 2.5% of the fundamental clock frequency. That it, the frequency range over which energy is dispersed extends from a value that extends from 2.5% below the fundamental clock frequency to 2.5% above the fundamental clock frequency. In another example, a down spread embodiment may have a range of 5%, wherein the energy is dispersed over a frequency range from 5% below the fundamental frequency up to the fundamental frequency. The specific settings of configuration controller 214 may be factory presets in one embodiment. Another embodiment is possible and contemplated wherein the settings of configuration controller 214 may be programmed by a user.

Figure 4:
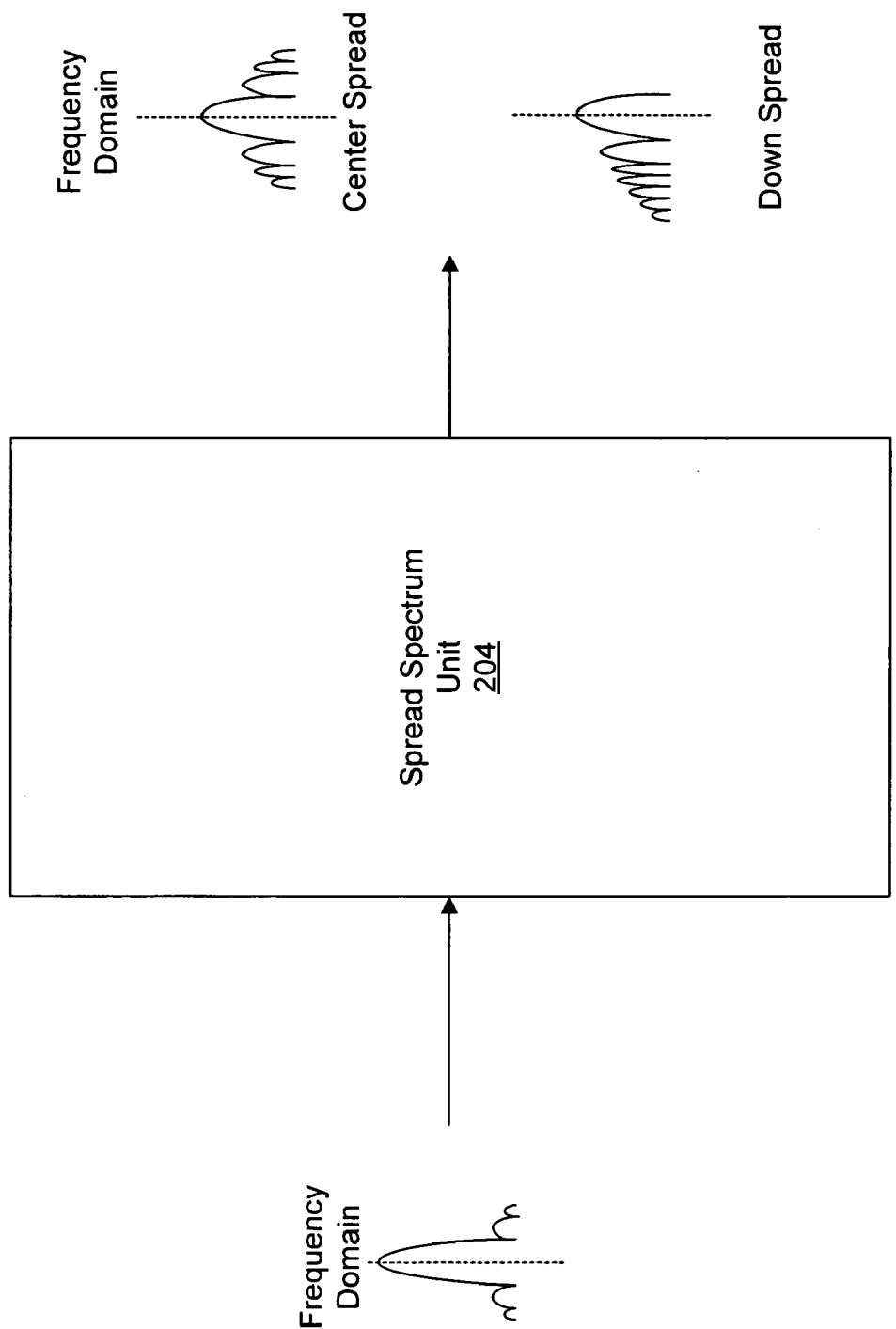
FIG. 4 is a drawing illustrating the operation of one embodiment of a spread spectrum unit.

FIG. 4 is a drawing illustrating the operation of one embodiment of a spread spectrum unit. In the embodiment shown, spread spectrum unit 204 is coupled to receive an input clock signal, wherein a majority of the energy of the clock signal is concentrated around its center frequency. Spread spectrum unit 204 is further configured to provide an output clock signal. Two possible examples of a frequency domain representation of an output clock signal are shown.

In the first example, spread spectrum unit 204 is operating in a center spread mode, and thus the energy of the output clock signal is spread a range of frequencies both below and above the fundamental clock frequency. The amplitude of the output clock signal at the fundamental frequency is lower than that of the input clock signal. Conversely, the amplitudes of signals in the frequencies above and below the fundamental clock frequency are greater for the output clock signal than for the input clock signal. In addition, the energy is dispersed over a wider signal range.

In the second example, spread spectrum unit 204 is operating in a down spread mode. In this case, the energy of the output clock signal is largely spread among a spectrum of frequencies below the fundamental clock signal frequency. As with the center spread example, the signal amplitude at the fundamental clock frequency is lower for the output clock signal than for the input clock signal. Amplitude of signals below the fundamental clock frequency are higher at the output than at the input.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A clock board for a redundant clock distribution system, the clock board comprising:
   a clock synthesizer configured to provide an input clock signal, wherein energy of the input clock signal is substantially concentrated around an input clock signal frequency; and
   a spread spectrum unit coupled to receive the input clock signal from the clock synthesizer, wherein the spread spectrum unit is configured to frequency modulate the input clock signal, thereby producing an output clock signal, wherein energy of the output clock signal is spread over a range of frequencies, and wherein, when the clock board is operating as a master in a redundant clock distribution system having a master clock board and a slave clock board, the spread spectrum unit is enabled;
   wherein the clock board is configured to disable the spread spectrum unit when operating as the slave clock board; and
   wherein the clock board, when operating as the slave clock board, is configured to assume the role of the master responsive to a failure of the master clock board.

2. The clock board as recited in claim 1, wherein the range of frequencies is centered around the input clock signal frequency.

3. The clock board as recited in claim 1, wherein the range of frequencies extends from the input clock signal frequency down to a lower frequency.

4. The clock board as recited in claim 1, wherein the range of frequencies is a predetermined is based on a percentage of the input clock signal frequency.

5. The clock board as recited in claim 4, wherein the predetermined percentage is programmable.

6. The clock board as recited in claim 1, wherein the spread spectrum unit is coupled to provide the output clock signal to a buffer, and wherein the buffer is configured to provide the output clock signal to clocked circuits in a computer system.

7. The clock board as recited in claim 6, wherein the clock synthesizer is coupled to receive a feedback clock signal form the clock buffer.

8. The clock board as recited in claim 1, wherein the clock board includes a crystal configured to generate a crystal clock signal, and wherein the clock synthesizer is coupled to receive the crystal clock signal.

9. The clock board as recited in claim 1, wherein the clock synthesizer is configured to receive a reference clock signal from another clock board.

10. The clock board as recited in claim 1, wherein the clock buffer is configured to provide a reference clock signal to another clock board.

11. A computer system comprising:
    a plurality of clocked circuits;
    a first clock board coupled to the plurality of clocked circuits; and
    a second clock board coupled to the plurality of clocked circuits;
    wherein each of the first and second clock boards includes a clock synthesizer configured to provide an input clock signal, and a spread spectrum unit coupled to receive the input clock signal, wherein the spread spectrum unit is configured to frequency modulate the input clock signal, thereby producing an output clock signal, wherein energy of the output clock signal is spread over a range of frequencies;
    wherein the first clock board is configured to operate as a master clock board and the second clock board is configured to act as a slave clock board, wherein energy of the input clock signal received by the master clock board is substantially concentrated around an input clock signal frequency, and wherein, responsive to a failure of the first clock board, the second clock board is configured to operate as the master clock board; and
    wherein the spread spectrum unit of the master clock board is enabled and the spread spectrum unit of the slave clock board is disabled.

12. The computer system as recited in claim 11, wherein the range of frequencies is centered around the input clock signal frequency.

13. The computer system as recited in claim 11, wherein the range of frequencies extends from the input clock signal frequency down to a lower frequency.

14. The computer system as recited in claim 11, wherein the range of frequencies is based on a predetermined percentage of the input clock signal frequency.

15. The computer system as recited in claim 14, wherein the predetermined percentage is programmable.

16. The computer system as recited in claim 11, wherein each of the first and second clock boards includes a buffer, and wherein the spread spectrum unit of each of the first and second clock boards is coupled to provide its respective output clock signal to its respective buffer.

17. The computer system as recited in claim 16, wherein the buffer of each of the first and second clock boards is coupled to provide its respective output clock signal to clocked circuits in the computer system.

18. The computer system as recited in claim 16, wherein the clock synthesizer of each of the first and second clock boards is coupled to receive a feedback clock signal from its respective buffer.

19. The computer system as recited in claim 11, wherein each of the first and second clock boards includes a crystal configured to generate a crystal clock signal, and wherein the clock synthesizer of each of the first and second clock boards is coupled to receive the crystal clock signal from its respective crystal.

20. The computer system as recited in claim 11, wherein the clock synthesizer of the first clock board is coupled to receive a reference clock signal from the second clock board, and wherein the second clock board is coupled to receive a reference clock signal from the first clock board.

* * * * *